July 31, 1962  L. A. BIXBY  3,046,813
TRANSFER CASE WITH BRAKE AND POWER TAKE-OFF
Filed Feb. 26, 1958  5 Sheets-Sheet 1
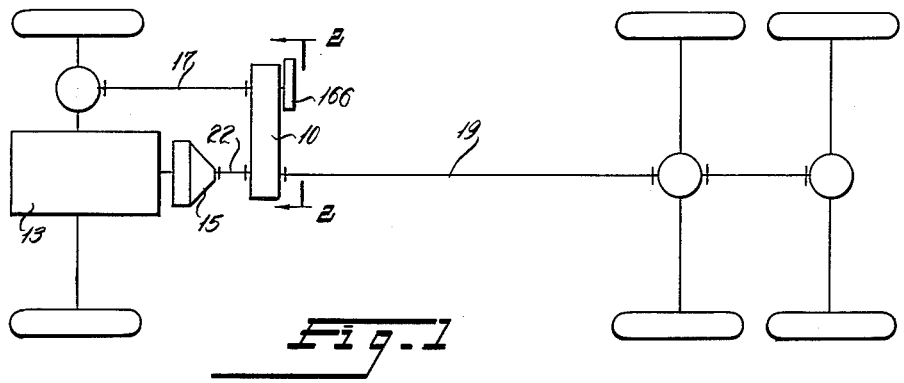
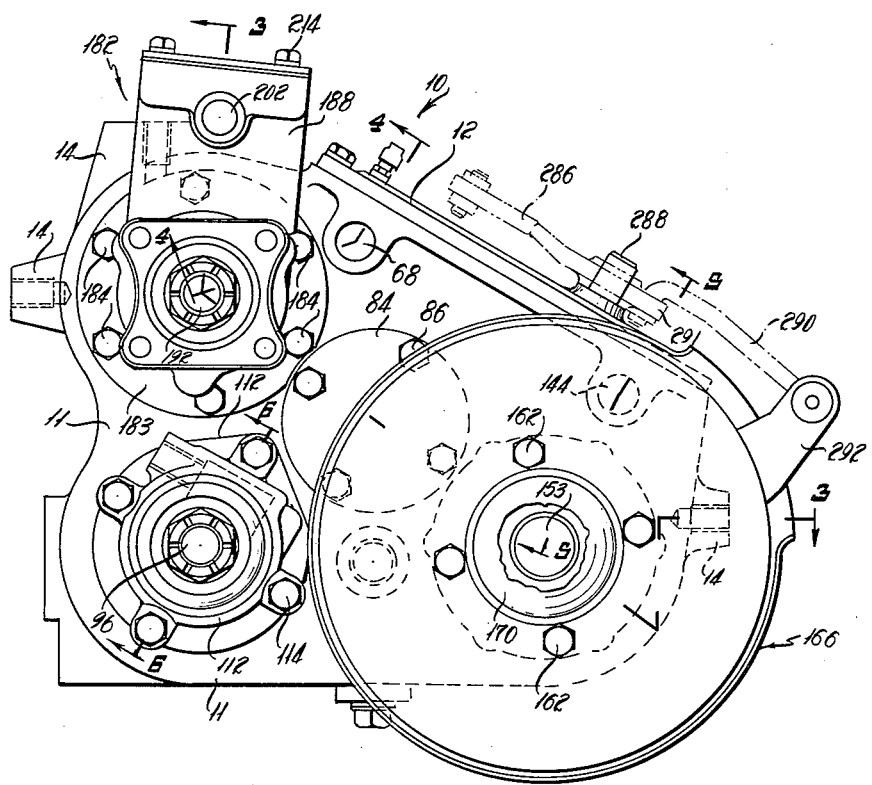
INVENTOR.
LEO A. BIXBY
BY
Strauch, Nolan + Neale
ATTORNEYS

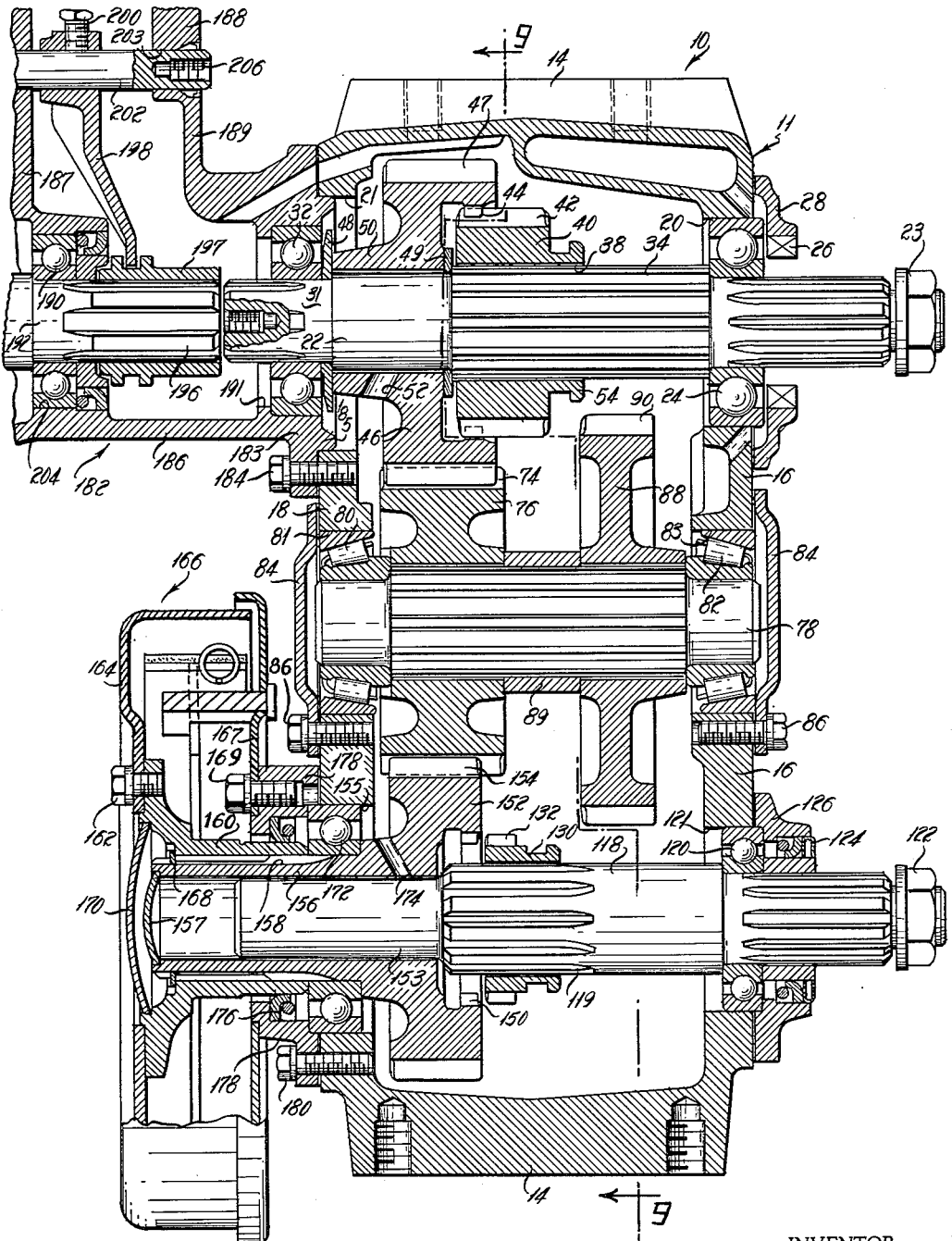

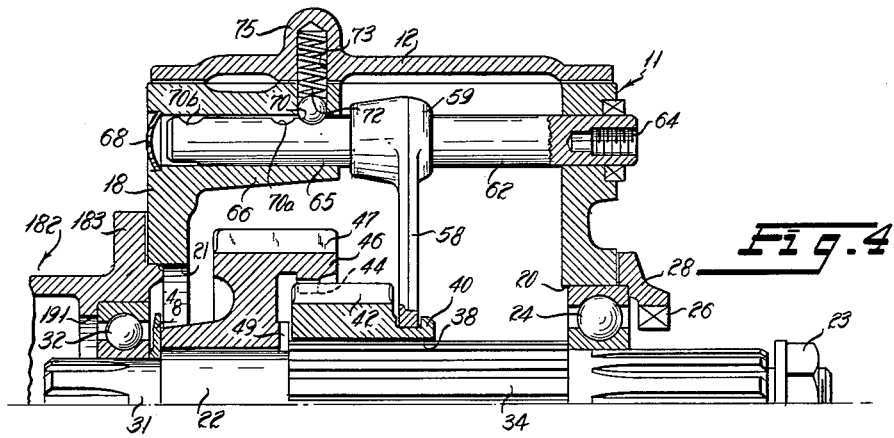

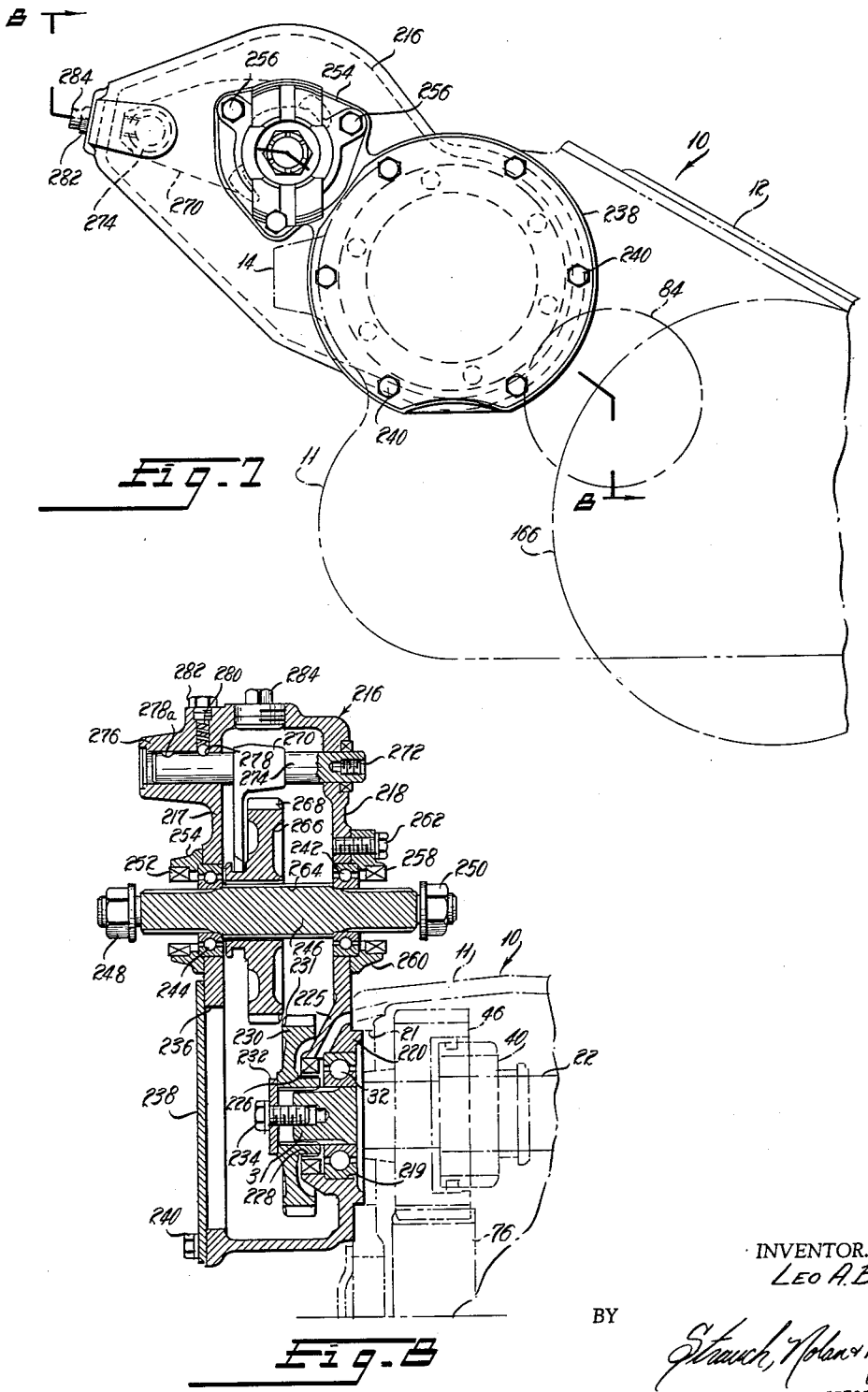

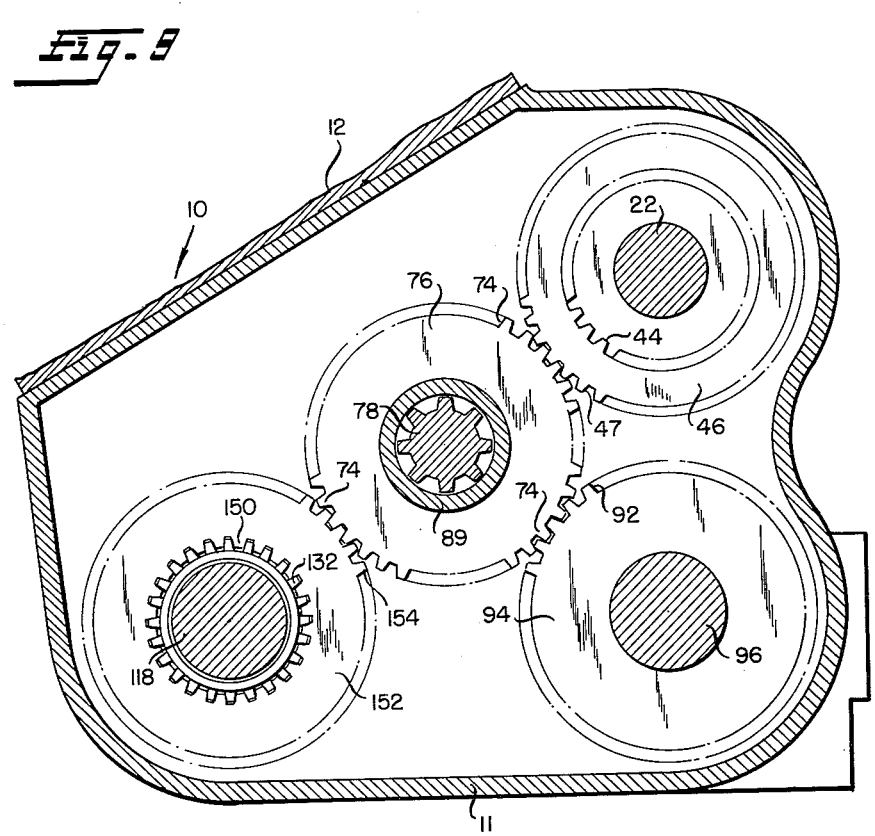

United States Patent Office 3,046,813
Patented July 31, 1962

3,046,813
TRANSFER CASE WITH BRAKE AND POWER TAKE-OFF
Leo A. Bixby, Niles, Mich., assignor to Rockwell-Standard Corporation, a corporation of Pennsylvania
Filed Feb. 26, 1958, Ser. No. 717,769
10 Claims. (Cl. 74—665)

This invention relates to improvements in power transmitting mechanism and more particularly to transfer cases providing multiple output drives from a single input drive, such as disclosed in L. A. Bixby's United States Letters Patent No. 2,344,388 and others commonly used in vehicles having multiple drive axles.

A preferred embodiment of the present invention is for use as a part of a vehicle driving mechanism which transmits power from a prime mover, such as an internal combustion engine, over a change speed transmission through a transfer case to the final drives of a plurality of drive axles. Such arrangements are commonly known as 4 x 4, 4 x 6 or 6 x 6. Multiple drive axle vehicles transfer cases generally provide power transmitting mechanisms by means of which both the front and rear axles may be positively driven at substantially uniform speed, clutching devices being included whereby either front or rear drive axle may be disconnected from the transmission gear train so that power is transmitted only to the rear drive axle(s) or to both the front and rear drive axles.

In many instances, additional power take-off units are provided on the transfer cases, the take-offs being associated with ends of transfer case mounted drive shafts, which ends are not directly used to transmit power to a drive axle. The free end of the power input shaft is preferred for this purpose.

The transfer case should be compact to enable alignment of propeller shafts, transfer case drive shafts and drive axle differential inputs as close as possible and also to dispose the transfer case as far above ground level as possible. In maintaining this compact nature of transfer cases, the incorporation of power take-off units with the transfer cases encounters mechanical interference difficulties, particularly with respect to the location of the emergency brake. Desirably, the brake should be mounted so that it will at all times be mechanically connected to the rear drive axle, which factor necessitates that the brake be mounted either direct to the rear output shaft or, as disclosed in the present invention and constituting a feature thereof, on the free end of the front output shaft. The power take-off unit is, as aforementioned, preferably to be mounted on the free end of the input shaft which would be on the same side as the brake. In the disclosed embodiment a so-called through drive to tandem rear axles is assumed—that is, one propeller shaft drive both rear axles in a six wheeler. With a so-called through drive only one rear output shaft from the transfer case is necessary instead of the usual two. To mount the brake direct on the rear output shaft results in awkward construction of the transfer case and arrangement of the internal gearing since the brake must clear the power take-off unit on the input shaft.

Accordingly, a primary object of the present invention resides in the provision of an improved transfer case with novel brake arrangement for a multiple drive axle vehicle.

Another object resides in the provision of a novel transfer case having its brake mounted on the rear of the front output shaft and clearing a power take-off unit mounted on the rear of the power input shaft, the braking action being directed to the rear driving axles through the transfer case gear train and being such that a complete uniform braking to all output shafts is assured when an incorporated clutch for the front drive is engaged.

A further object resides in the provision of a novel transfer case in which a loose gear mounted on a trunnion portion of the front output shaft has an extended hub to accommodate a brake mounting flange, the said loose gear being engaged to or disengaged from the front output shaft by means of a sliding clutch.

A still further object related to the previous object resides in the provision of the novel loose gear on the output shaft having its extended hub externally splined to accommodate an internally splined brake mounting flange, the said loose gear being engaged to or disengaged from the front output shaft by means of a sliding clutch on a splined portion of the front output shaft adjacent to the trunnion portion, said sliding clutch provided with external gear teeth to mesh with corresponding internal gear teeth of the loose gear when engaged.

Still another object resides in the novel provision for mounting a separable auxiliary take-off housing on the rear of the transfer case in the vicinity of the input shaft with a stub shaft which has both ends splined and disposed in exact linear alignment with the input shaft, the inside end of the stub shaft carrying a sliding clutch member establishing, when engaged, a rigid connection with the rear end of the input shaft, and the outside end of the stub shaft enabling connection thereto of a flange to which may be mounted a propeller shaft for transmitting power to any mechanical driven device direct from the input shaft and in the same rotating direction as the latter, and selectively operative at all times whether or not the vehicle itself is in motion.

A still further object resides in the provision for a transfer case, of a novel auxiliary power take-off unit with input shaft and a combined fore and aft output shaft, the power being transmitted from the transfer case input shaft through a driver gear on the input shaft to a driven gear on the output shaft of the power take-off unit, the auxiliary output shaft having either one or two splined ends to enable connection thereto of a flange or flanges for a front or rear connection, or both, its rotating direction being reversed from that of the transfer case input shaft.

Further novel features and other objects of this invention will become apparent from the following detailed description, discussion and the following claims taken in conjunction with the accompanying drawings showing preferred structures and embodiments in which:

FIGURE 1 is a schematic plan view of a 6 x 6 vehicle illustrating the relationship of a transfer case, in accord with the present invention, to the power drive shaft from the vehicle engine and main transmission, the front axle drive and so-called through drive to the rear axles;

FIGURE 2 is a rear elevation view illustrating a preferred embodiment of a transfer case constructed according to this invention and shows details of the rear output drive, the auxiliary power take-off mounted behind the transfer case input and the brake mounted on the transfer case behind the front output drive;

FIGURE 3 is a detailed section view taken on line 3—3 of FIGURE 2 and illustrates the transfer case input, counter and front output shafts with associated gears together with details of one embodiment of an auxiliary take-off unit;

FIGURE 4 is a detail section view taken on line 4—4 of FIGURE 2, illustrating the clutch shift mechanism associated with the transfer case input drive shaft;

FIGURE 5 is a detail section view taken on line 5—5 of FIGURE 2, illustrating the clutch shift mechanism associated with the transfer case front output drive shaft;

FIGURE 6 is a detail section view taken on line 6—6 of FIGURE 2, illustrating the rear output drive shaft and associated gears;

FIGURE 7 is a rear elevation view illustrating an alternate power take-off unit mounted on the rear end of the transfer case power input shaft;

FIGURE 8 is a transverse section through the alternate auxiliary power take-off unit taken on line 8—8 of FIGURE 7, mounted on the rear of the transfer case behind the input shaft, details of the transfer case being shown by phantom lines in a broken away portion; and FIGURE 9 is a section view taken on line 9—9 of FIGURE 3 and illustrates the manner in which the transfer gears mesh within the housing.

Referring now to the drawing figures for a specific description of an exemplary, preferred embodiment, FIGURE 2 is a rear elevation of a transfer case 10 with an integral housing 11, having a top opening, enclosing the transfer gearing and provided with a cover 12 for easy access to its interior. A suitable number of bosses 14 integral on housing 11 provide mounts to secure the case 10 by bolts to the frame of a vehicle. FIGURE 1 schematically represents the skeleton of a 6 x 6 vehicle and illustrates the relationship of the transfer case 10 to the power plant 13, main transmission 15, the front wheel drive propeller shaft 17 and the rear wheel drive propeller shaft 19 whereby, it will be noted, the transfer case input shaft 22 and the output to the rear axles are on a common vertical line and the output shaft to the rear axles and front output on a common horizontal line (FIGURE 2).

With particular reference to FIGURES 2 and 3, the front and rear walls 16 and 18 of transfer case housing 11 are parallel and have a generally triangular shape with the lower horizontal portion constituting a base of the triangle and the upper portion constituting an apex of the triangle. Aligned apertures 20 and 21 in respective front and rear walls 16 and 18 are situated near the upper left hand corner of housing 11. A power input shaft 22, splined and threaded at its front end to accommodate and secure a connection flange or the like (not shown) by a fastening nut 23 to establish a rigid connection with a main propeller shaft which transmits power from change speed transmission in FIGURE 1 to the transfer case 10, is rotatably mounted in a bearing 24, the outer race of which is disposed in front wall aperture 20. Bearing 24 is sealed from the exterior by an oil seal 26, press fitted into an aperture of an oil seal cover and bearing retainer 28. The rear end 31 of input shaft 22, extending through the rear wall aperture 21 and beyond the housing rear wall 18, is provided with external splines for a purpose to be hereinafter described, and is journalled in a bearing 32. Bearing 32 is retained either in a separate bearing retainer (not shown) when used without an auxiliary power take-off or in an aperture of the adjacent power take-off as illustrated in FIGURES 3 and 8. The intermediate section of the input shaft 22, disposed within housing 11, is provided with axially extending splines 34 which starts adjacent to the interior side of the front housing wall 16 and provides a shoulder abutting the inner race of front bearing 24.

Splined input shaft section 34 is provided to engage the internal splines 38 of a clutch shift member 40 disposed for axial shift on shaft 22. Clutch member 40 is provided at one end with external gear teeth 42 which, in its rearward shifted position (FIGURES 3 and 4), engage internal clutch teeth 44 formed on one side of a helical gear 46 which is rotatably mounted and axially fixed upon input shaft 22 near the rear wall 18 within the housing 11 between two side bearing plates 48 and 49. Hub 50 of gear 46 is provided with a lubrication passage 52 directed to its bore.

Gear clutch member 40 has a hub extension 54 which is provided with a circumferential groove to receive the arms of a shift fork 58 (FIGURE 4). An apertured boss 59 on fork 58 is secured to a shift rod 62 extending thru both front and rear walls 16 and 18 above and parallel to the axis of input shaft 22. Axial shifting of shift rod 62 in the housing 11 will shift the clutch gear member 40 into or out of engagement with the external teeth of a spur gear 88, the disposition and purpose of which is described hereinafter. In FIGURE 4, the shift rod 62 is shown with its front end 64 internally threaded to accommodate a connection with any suitable shift actuating device (not shown). The rear portion 65 of shift rod 62 slidably projects through an aperture of a boss like formation 66 on the rear wall 18, its rear end portion being covered by a welch plug 68 pressed in an enlarged counterbored end portion of the aperture in boss 66. Rear portion 65 of rod 62 is provided with three spaced recesses 70, 70a and 70b on the upper side which cooperate with a spring loaded ball detent assembly 72 which is inserted into a bore 73 in the boss like extension 66 and cover 12. The spring of detent assembly 72 extends into a recess 75 in cover 12 of housing 11 which confines the detent assembly 72 to provide a resilient bias to releasably maintain the rod 62 and clutch member 40 in any of three positions, the intermediate position being a neutral or disengaged position.

External teeth 47 of the helical gear 46 on input shaft 22 are in constant mesh with the teeth 74 of another helical gear 76 mounted on an axially splined intermediate or counter shaft 78 disposed beside and parallel to input shaft 22 thru the midsection of housing 11. Intermediate shaft 78 is rotatably mounted in two tapered roller bearings 80 and 82 disposed respectively in an aperture 81 of the rear wall 18 and an aperture 83 of the front wall 16. Both ends of shaft 78 are protected by bearing retaining covers 84 secured to the exterior of respective side walls 16 and 18 by a plurality of screws 86.

The loose gear 46 on input shaft 22 will, as is evident, transmit power to its meshed counter gear 76 on intermediate shaft 78 only when rigidly drive connected to input shaft 22 by means of the gear clutch member 40 shifted to detent position 70 (FIGURES 4 and 3). This position establishes a high speed ratio. When member 40 is disengaged (neutral), gear 46 just idles. Splined on the front portion of the intermediate shaft 78, within housing 11, is the aforementioned spur gear 88 which is larger than and spaced apart from gear 76 by a spacer sleeve 89. Gear 88 has external teeth 90 provided for engagement with external gear teeth 42 of gear clutch member 40 which, when shifted to its forward position where detent assembly 72 engages recess 70b, provides a low speed ratio. The two gears 76 and 88 and intermediate shaft 78 to which both are splined in axially fixed relationship constitute an assembly, all components of which will always rotate together. If desired, gears 76 and 88 and sleeve 89 may be constructed as an integral unit rotatably mounted on a non-rotatable shaft.

Turning now to FIGURES 6 and 9, teeth 74 of the rear gear 76 on intermediate shaft 78 are in constant mesh with the teeth 92 of another gear 94 splined at 93 and axially fixed to a rear output stub shaft 96. Shown in FIGURE 2, the rear output shaft 96 is below, parallel to, and a vertical plane through its axis will pass through input shaft 22. It is thus disposed in the lower section of the generally triangular housing 11.

Rear output shaft 96 is rotatably supported at its forward end in a tapered roller bearing 98 inserted into an aperture 99 in the front housing wall 16 and is protected by a cover and bearing retainer 100 secured to the exterior of front wall 16 by a plurality of screws 102. The rear end portion of shaft 96 extends thru an aperture 103 in the rear wall 18, rotating on a similar tapered roller bearing 104 disposed in rear wall aperture 103 and is splined adjacent its outer end to accommodate a connection flange (not shown), to be secured thereto by a fastening nut (not shown) to provide a driving connection to the rear drive shaft 19 (FIGURE 1). Secured to the outer end of rear output shaft 96 clamped between the connection flange and a spacer 106 is a small worm gear 108 meshing with a worm 110 disposed on a transverse axis and contained within a separate housing and rear bearing retainer 112 which surrounds the extended rear portion of rear output shaft 96 and is secured to the rear wall 18 by a number of screws 114. An oil seal 116 is inserted in the open end of housing 112 over shaft 96. The worm and worm gear assembly enables a speedometer drive take-off.

As before described, gear 94 on rear output shaft 96 is in constant mesh with gear 76 (FIGURE 9) on the intermediate shaft 78 so that driving power will be transmitted in either the high or low speed thru the medium of sliding clutch member 40. To establish a direct gear drive in high speed, clutch member 40 will engage the internal teeth 44 of gear 46 thereby drivingly connecting the gear 46 with the input shaft 22, transmitting power to intermediate gear 76 and from there to gear 94 on the rear output shaft 96. In low speed, the gear teeth 42 of clutch gear member 40 engage teeth 90 of the front intermediate gear 88, power is transmitted through shaft 78 to gear 76 and thence to gear 94 of the rear output shaft 96. Input shaft 22 and rear output shaft 96 are, as obvious, rotating in the same direction.

Referring now to the right hand portion (looking forward) of housing 11 in FIGURES 3 and 5, a front output shaft 118 is rotatably mounted on its forward drive output end in a bearing 120 fitted into an aperture 121 through front housing wall 16. Its forwardly projected end is splined and threaded to accommodate a mounting flange (not shown) which is secured thereto by a fastening nut 122, to drivingly connect to front drive shaft 17 (FIGURE 1). An oil seal 124 is press fitted into a seal and bearing retainer cover 126 secured to front wall 16.

The intermediate section of front output shaft 118, within housing 11, has been splined at 119 to accommodate the internal splines of a sliding clutch member 130 which is provided at one end with external teeth 132. Clutch member 130 has its forward end circumferentially grooved to receive the arms of a shifting fork 134 secured to a shift rail 136 (FIGURE 5). Shift rail 136 is slidably inserted parallel to and above the front output shaft 118 in an aperture in the front wall 16 and projects outwardly therethrough and its front end is provided with internal threads 140 to fasten any suitable actuating device (not shown). The rear end of rail 136 extends into an aperture of an inwardly extended boss portion 142 of rear housing wall 18 and the open end of the rear aperture is closed by a welch plug 144. The rear section of shift rail 136 has been provided with notches 146 and 146a to cooperate with a spring loaded ball detent assembly 148 inserted transversely into the boss-like extension 142. A spring of detent assembly 148 extends into the housing cover 12 of housing 11 to provide a resilient bias, yieldingly holding the parts in either of two shift positions. Shifting movement of clutch member 130 will engage or disengage its teeth 132 with the internal teeth 150 of a gear 152 which, as will now be described, connects or disconnects the front drive.

Gear 152 is rotatably mounted on a rear trunnion portion 153, of front output shaft 118, which is adjacent to the intermediate splined part 119, and projects rearwardly through and beyond an aperture 155 in rear housing wall 18. Gear 152 has external teeth 154, which are in constant mesh with teeth 74 of intermediate gear 76, the gear 152 also being provided with a rearwardly projected hub part 156 extending through the apertrue 155 and beyond the end of shaft 118, the open end of hub 156 being closed by a welch plug 157.

Hub extension 156 of gear 152 is provided with external, axially disposed splines 158 to receive and drivingly connect the gear 152 to an internally splined brake flange 160. Seen in FIGURE 3, a brake drum 164 is secured to brake flange 160 by means of screws 162, and encloses a suitable conventional braking mechanism. The splined hub of brake flange 160 is axially retained on the splined portion of the gear hub 156 by an inserted retaining ring 168, the overhanging end of the brake flange hub being closed by a welch plug 170. Gear hub 156 is rotatably mounted on a bearing 172, disposed in the rear wall aperture 155, and is provided with a lubrication channel 174 which enables oil from the transfer case housing 11 to reach the trunnion portion 153 of shaft 118. An oil seal 176, inserted into a seal and bearing retaining cover 178 secured to rear wall 18 by means of screws 180, and in frictional contact with the outside of the hub of the brake flange 160 protects the bearing 172. The brake assembly backing plate 167 is fastened to seal and bearing retaining cover 178 by screws 169.

A bell crank lever 286 (FIGURE 2) is mounted on a stud 288 upstanding from transfer case cover 12 and has a short arm 291 connected through a link 290 to the brake mechanism actuating lever 292. Suitable operating linkage (not shown) is connected to lever 286 for brake operation.

This brake arrangement on the transfer case constitutes a main feature of the present invention. It has not been, prior to this, the practice to mount the emergency brake on the rear end of the front output shaft because the brake had to be associated with a positive drive connection to the rear drive. The described novel brake mounting however, assures a constant connection with the rear drive whether the front drive is connected or not, this relationship being achieved by securing the brake drum 164 on the loose gear 152 which, being in constant mesh with intermediate gear 76 and being of the same size as gear 94 on rear output shaft 96, rotates—and with it the brake drum 164—at the same speed as the rear output shaft 96 and assures a uniform braking action through the gear train. When applying the brake, a non-rotating frictional braking element (not shown) inside the brake assembly 166 presses outwardly against the inside of the rotating drum 164 stopping its motion and consequently the revolving of gear 152 to which it is splined, which gear 152 is turn stops the entire gear train within the case.

To establish front wheel drive it is merely necessary to shift the sliding clutch member 130 from the disengaged position 146a to position 146 (FIGURE 5) which places the external teeth 132 of clutch member 130 in mesh with the internal teeth 150 of gear 152 to establish a rigid driving connection between gear 152 and front output shaft 118 which will then rotate at the same speed as the rear output shaft 96 and will also be uniformly braked in connection with the latter upon actuation of brake assembly 166.

Input gear 46, rear output gear 94 and front output gear 152 are always meshed with the counter gear 76. Preferably, the three gears 46, 94 and 152 are the same diameter and have the same number of teeth. So constructed, the distances from the axis of the counter gear 76 to the axis of each of the three gears 46, 94 and 152 will be equal, and the same relationship holds true for the axes of countershaft apertures 83 and 81, input shaft apertures 20 and 21, front output shaft apertures 121 and 155 and rear output shaft apertures 99 and 103.

*Auxiliary Power Take-Off*

Referring to FIGURES 2 and 3, an auxiliary power take-off housing 182 shown only in part section in FIGURE 3 is optionally mounted on the transfer case housing rear wall 18 in the vicinity of power input shaft 22. The auxiliary housing 182 is secured with its front wall 183 against the rear wall 18 of the transfer case housing 11 by means of screws 184 and encloses selectively engageable power take-off mechanism. The take-off unit will be hereinafter referred to as P.T.O. An axially extending integral flange 185 from front wall 183 pilots the P.T.O. housing 182 in aperture 21 of rear wall 18 of the transfer case housing 11 to assure accurate alignment. Auxiliary housing 182 includes a lower essentially cylindrical section 186 and an upwardly angled, extended portion 188. The interior of cylindrical section 186 is provided with appropriate bearing seats to receive the outer races of two bearings 190 (one of which is shown) which rotatably mount a power transmitting shaft 192 disposed and maintained in axially fixed relation, and in proper linear alignment with the power input shaft 22 of transfer case 10.

End 31 of the transfer case power input shaft 22 extends a short distance beyond the rear wall 18 of transfer case housing 11 and into aperture 191 which retains bearing 32 in this instance in the front wall 183 of auxiliary housing 182. The power transmitting shaft 192 of the P.T.O. is splined at its rear end to accommodate a connection flange (not shown). The flange can be drivingly connected to a drive shaft or the like (not shown). P.T.O. shaft 192 also has an axially splined forward end 196 within housing 182 to receive an internally splined sliding clutch member 197 provided on its hub with a circumferential groove to receive the yoke of a shift fork 198.

Fork 198 is secured by a set screw 200 to a shift rail 202 extending parallel to shaft 192 thru the upwardly extended portion 188 in the upper part of the auxiliary housing 182 providing an aperture 203 in the front wall 189 of extension 188 and an aligned aperture 204 in the rear section 187 of extension 188 of P.T.O. housing 182. Shift rail 202 is provided in the usual manner with two notches (not shown) to cooperate with a spring loaded ball detent assembly (not shown) inserted transversely into the rear section 187 of extension 188. The detent assembly resiliently cooperates with shift rail 202 and permits shifting to either of its two positions to connect or disconnect the P.T.O. power transmitting shaft 192 with the end 31 of the transfer case power input shaft 22.

The sliding clutch member 197 is shifted by means of a shift lever connecting link (not shown), secured to the internally threaded outside end 206 of shift rail 202, which moves the shift rail 202 forwardly sliding the clutch member 197 so its internal splines are engaged with the externally splined end 31 of power input shaft 22 to establish a rigid connection between the two shafts 22 and 192. Shifting the clutch member 197 back to its initial position as shown in FIGURE 3 disconnects the shafts.

With this construction the P.T.O. can be selectively rendered operative at any time since the shaft 22 may transmit engine torque even when the transfer case sliding clutch member 40 is shifted to the neutral position 70a (FIGURE 4). In such condition, power will be transmitted only to the P.T.O. and the loose gear 46 in the transfer case 10 idles on shaft 22. For easy access to the shifting mechanism in the auxiliary take-off housing 182, a cover plate 212 is secured to the top side of the auxiliary housing 182 by a plurality of bolts 214.

*Alternate Auxiliary Power Take-Off*

FIGURES 7 and 8 show an alternate optional power take-off unit in an angularly upwardly extending housing 216 (FIGURE 7), with connections enabling either or both fore and aft output drives having a rotational direction which is reverse to that of the transfer case power input shaft. The housing front wall 218 has a lower mounting portion which includes an aperture 219 surrounded by a forwardly disposed annular pilot flange 220 inserted into an aperture 21 through the rear wall 18 of transfer case housing 11 (shown in phantom lines in FIGURE 8) in the vicinity of the power input shaft 22. Auxiliary housing 216 is secured to the transfer case 10 by screws (not shown).

An interior annular flange 225 on auxiliary housing wall 218 surrounds the aperture 219 to mount an oil seal 226 to retain the oil in P.T.O. case 216. Oil seal 226 is in frictional contact with a sleeve 228 inserted and secured between the bearing 32 and the hub of an externally toothed spur gear 230 secured to the splined end portion 31 of the power input shaft 22 by a retaining plate 232 abutting against the hub of gear 230 and fastened by a screw 234 screwed into the internally threaded end portion 31 of input shaft 22. A large aperture 236 in the auxiliary housing rear wall 217 opposite gear 230 provides easy access to the gear train of the P.T.O. and is closed by a cover 238 secured to rear wall 217 by screws 240.

Above the apertures 236 and 219, two smaller, aligned apertures, in rear wall 217 and front wall 218 of the auxiliary housing receive bearings 242 and 244, respectively, which rotatably support a shaft 246 parallel to and above the transfer case input shaft 22. One end of upper shaft 246 projects beyond the front wall 218 and over transfer case housing 11 and its rear end projects beyond rear wall 217. It is splined at both of the extended ends to accommodate connection flanges (not shown) to be secured thereto by fastening nuts 248 and 250, respectively, to drivingly connect with an auxiliary equipment (not shown). An oil seal 252, carried in a seal and bearing retaining cover 254 secured to rear wall 217 by screws 256, protects bearing assembly 244, and a similar oil seal 258, inserted in seal and bearing retaining cover 260 secured by screws 262 to front wall 218, protects bearing 242.

The intermediate portion 264 of auxiliary take-off shaft 246 is longitudinally splined inside the housing to receive the internal splines of a spur gear 266 which is slidingly secured thereon and has external teeth 268 which can be shifted into meshing contact with the teeth 231 of gear 230. Shifting is enabled by means of a shift fork 270 engaging a circumferential groove on the hub of gear 266. Shift fork 270 is secured to a shift rail 274 which extends parallel to shaft 246 thru an aperture in the front wall 218 and an outwardly extended boss 276 on the rear wall 217 in the upper portion of the auxiliary housing 216. Rail 274 is provided at its rear end section with two notches 278 and 278a to cooperate with a spring loaded ball detent assembly 280 inserted transversely into the boss 276 and rendered accessible by removing a screw cap 282. Another larger screw plug 284 in the top of the auxiliary take-off housing 216 provides access to the fork connection to the shift rail for assembling or dis-assembling purposes. The outwardly extending end of shift rail 274 is internally threaded at 272 to provide shift lever attaching means.

By shifting the gear 266 from position 278 to position 278a along the splines 264 of the shaft 246, teeth 268 will mesh with teeth 231 on gear 230 and hereby transmit driving power from gear 230 to the shaft 246. The drive can be a single forward drive wherein the rear end of the shaft may be capped, or a single rear drive wherein the front end of the shaft may be capped, or in both directions combined as illustrated in FIGURE 8.

Both power-take-off units 182 and 216 can be used with the same, herein disclosed, transfer case 10 without having any alterations made on the transfer case itself or impair the inherent characteristics thereof, especially in regard to the mounting of the brake. A number of lubrication channels as indicated in the drawings provide ample oil flow throughout the entire assembly including both versions of the P.T.O. unit.

The foregoing description discloses a transfer case with the brake mounted in such a manner, on the rear of the transfer case, that the brake assembly is entirely clear of both of the proposed power take-off units and the rear output shaft. A construction is disclosed whereby the brake is mounted on the rear end of the front output shaft, yet achieves a uniform braking action even when the front drive is not positively connected. This is accomplished by having the brake mounted on a hub portion of a front output shaft drive gear which is loosely mounted on a trunnion portion of the front output drive shaft, such gear being selectively connected to or disconnected from the front output shaft by a sliding clutch, but always being in constant mesh with the main gear train tied to the rear output shaft.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a transfer case having a housing, an input shaft journalled in said housing, a power take-off shaft carried by said housing coaxially of said input shaft, front and rear drive axle output shafts journalled in said housing, a first gear fixed on the rear drive axle output shaft, a second gear rotatable on the front drive axle output shaft, a releasable clutch for coupling said second gear to the front drive axle output shaft, and intermediate shaft journalled in said housing, a third gear on said intermediate shaft meshed with both of said first and second gears, means driving the intermediate shaft from the input shaft, and brake means for controlling rotation of said second gear.

2. In the transfer case defined in claim 1, said first and second gears being of the same size.

3. In the transfer case defined in claim 1, change speed gearing between the input and intermediate shafts.

4. In the transfer case defined in claim 1, said second gear having a hub extending externally through the housing, and said brake means comprising a drum secured on the hub outside the housing.

5. In a transfer case having a housing provided with front and rear walls, an input shaft journaled in the housing, an intermediate shaft journaled in the housing, means providing a drive connection between said input shaft and said intermediate shaft, a first output shaft journaled in the housing and extending through the rear wall for connection to a rear drive axle assembly, a second output shaft journaled in said housing in spaced relation to said first output shaft and extending through said front wall for connection to a front drive axle assembly, said second output shaft also extending through said rear wall, a first gear on said intermediate shaft, a second gear meshed with the first gear and fixed to said first output shaft, a third gear meshed with said first gear and rotatably mounted on said second output shaft, means within the housing for releasably clutching said third gear to said second output shaft, means rotatable with said third gear projecting through said rear housing wall, and cooperating brake means on said housing and said last named means.

6. In the transfer case defined in claim 5, said means rotatable with the third gear comprising a hub on the third gear supported in a bearing assembly in said rear wall, and said brake means comprising a drum fixed on the projecting housing and brake mechanism mounted on the gear hub for engagement with said drum.

7. A transfer case comprising a housing, an input shaft journalled in said housing on the upper portion thereof, a rear drive axle output shaft journalled in said housing directly beneath said input shaft, a front drive axle output shaft journalled in said housing substantially in a horizontal plane containing said rear drive axle output shaft, a counter-shaft journalled in said housing between said input shaft and said front drive axle output shaft, first, second and third gears on said counter-shaft, said rear axle output shaft and said front axle output shaft, respectively, and means establishing a driving connection between said input shaft and said first gear, said second and third gears being constantly engaged with said first gear.

8. The transfer case according to claim 7 together with a power take-off drive mechanism mounted coaxially of said input shaft.

9. The transfer case according to claim 7 together with a brake mechanism having a part thereof mounted on said transfer case and a cooperating relatively movable part constantly connected to said second gear.

10. A transfer case comprising a housing having front and rear walls, an input shaft journalled in said housing and projecting forwardly of said front wall for connection to a power source, a power take-off mechanism carrier by said rear wall coaxially of said input shaft, a rear drive axle output shaft journalled in said housing beneath said input shaft, a front drive axle output shaft, a bearing carried by said front wall and rotatably supporting the front end of said front drive axle output shaft, the rear end of said front drive axle output shaft having a trunnion portion projecting through an opening in said rear wall, a gear having an elongated hub journalled on said trunnion portion, a single bearing rotatably supporting said gear, a brake mechanism mounted on said rear wall and having a part drivingly connected to said gear hub, and means establishing a constantly engaged driving connection between said gear and said rear drive axle output shaft.

References Cited in the file of this patent

UNITED STATES PATENTS

| | | |
|---|---|---|
| 1,559,617 | Johnston | Nov. 3, 1925 |
| 2,290,089 | Bock | July 14, 1942 |
| 2,354,300 | Bock | July 25, 1944 |
| 2,633,754 | Gerst | Apr. 7, 1953 |
| 2,764,898 | Gerst | Oct. 2, 1956 |
| 2,787,171 | Silver | Apr. 2, 1957 |
| 2,850,920 | Buckendale | Sept. 9, 1958 |
| 2,867,126 | Bolster | Jan. 6, 1959 |